US008037537B1

(12) United States Patent
Sharma et al.

(10) Patent No.: US 8,037,537 B1
(45) Date of Patent: Oct. 11, 2011

(54) SYSTEM, METHOD, AND COMPUTER PROGRAM PRODUCT FOR CONDITIONALLY SECURING DATA STORED ON A PERIPHERAL DEVICE COUPLED TO A SYSTEM, BASED ON A STATE OF THE SYSTEM (75) Inventors: Pramod Sharma, Tanakpur (IN); Anil Z. Chakravarthy, Kurnool (IN)

(73) Assignee: McAfee, Inc., Santa Clara, CA (US)

( * ) Notice: Subject to any disclaimer, the term of this patent is extended or adjusted under 35 U.S.C. 154(b) by 965 days.

(21) Appl. No.: 11/946,771

(22) Filed: Nov. 28, 2007

(51) Int. Cl.
*G06F 17/30* (2006.01)
(52) U.S. Cl. .................... 726/26; 726/3; 726/2
(58) Field of Classification Search .............. 726/26, 726/3, 2
See application file for complete search history.

(56) References Cited

U.S. PATENT DOCUMENTS 6,088,802 A * 7/2000 Bialick et al. .................... 726/3

OTHER PUBLICATIONS

Encryption of Computer Peripheral Devices By Kelly R. Norman; Apr. 2006.*
Exploiting Memory Access Patterns to Improve Memory Performance in Data-Parallel Architecture; Byunghyun Jang; Schaa, D.; Mistry, P.; Kaeli, D.; Parallel and Distributed Systems, IEEE Transactions on vol. 22 , Issue: 1; Publication Year: 2011 , pp. 105-118.*
Understanding transactional memory performance; Porter, D.E.; Witchel, E.; Performance Analysis of Systems & Software (ISPASS), 2010 IEEE International Symposium on; Publication Year: 2010 , pp. 97-108.*
The checkpoint mechanism in KeyKOS; Landau, C.R.; Object Orientation in Operating Systems, 1992., Proceedings of the Second International Workshop on ; Publication Year: 1992 , pp. 86-91.*

* cited by examiner

*Primary Examiner* — David Y Jung
(74) *Attorney, Agent, or Firm* — Wong, Cabello, Lutsch, Rutherford & Brucculeri, L.L.P.

(57) ABSTRACT

A system, method, and computer program product are provided for conditionally securing data stored on a peripheral device coupled to a system, based on a state of the system. In use, a state of a system is identified. In addition, data stored on a peripheral device coupled to the system is conditionally secured, based on the state.

14 Claims, 5 Drawing Sheets

SYSTEM, METHOD, AND COMPUTER PROGRAM PRODUCT FOR CONDITIONALLY SECURING DATA STORED ON A PERIPHERAL DEVICE COUPLED TO A SYSTEM, BASED ON A STATE OF THE SYSTEM

FIELD OF THE INVENTION

The present invention relates to data loss prevention, and more particularly to preventing data loss associated with peripheral devices.

BACKGROUND

Data loss prevention systems have traditionally been utilized for preventing the loss of data. For example, the data loss prevention systems have generally restricted unauthorized access to confidential data. However, traditional data loss prevention systems have customarily exhibited various limitations, particularly with respect to loss of data stored on peripheral devices.

For example, a peripheral device containing sensitive data (e.g. confidential data, etc.) may be physically removed from a system by an unauthorized individual. This removal of the peripheral device may therefore result in the unwanted loss of the sensitive data stored on the peripheral device. However, in many situations, physically securing the peripheral device to the system may be costly, time consuming, and/or physically restricting. For example, it may be impractical to physically secure every peripheral device attached to a system, especially when the peripheral device is intended for mobile use [e.g. a universal serial bus (USB) drive, etc.].

There is thus a need for addressing these and/or other issues associated with the prior art.

SUMMARY

A system, method, and computer program product are provided for conditionally securing data stored on a peripheral device coupled to a system, based on a state of the system. In use, a state of a system is identified. In addition, data stored on a peripheral device coupled to the system is conditionally secured, based on the state.

DETAILED DESCRIPTION

Figure 1:
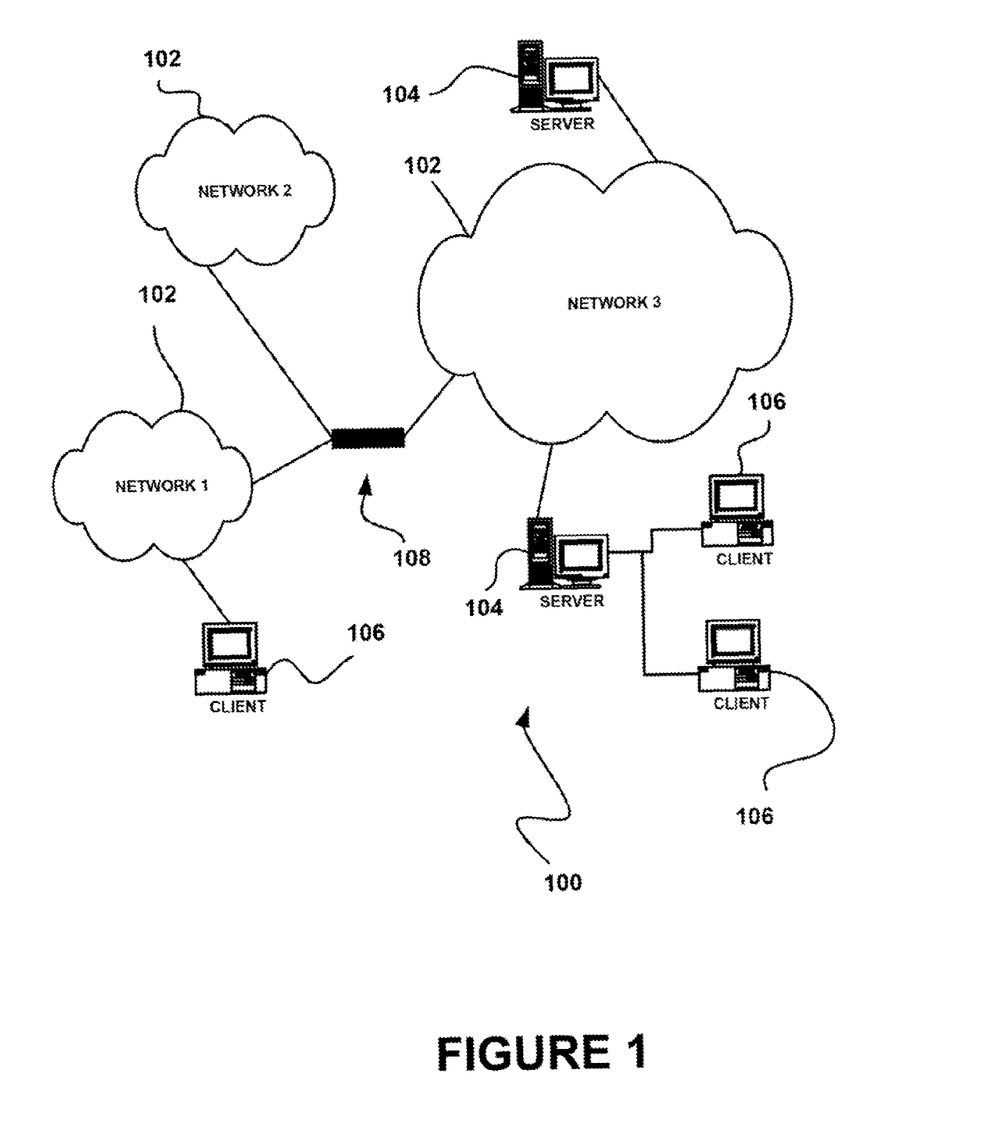
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and or any other type of logic. In order to facilitate communication among the networks 102, at least one gateway 108 is optionally coupled therebetween.

Figure 2:
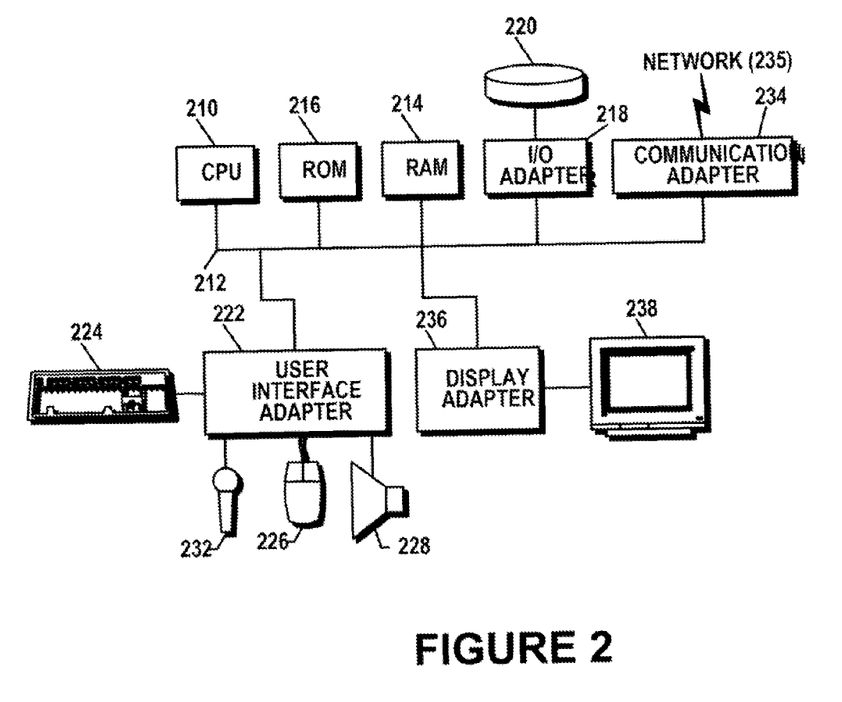
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
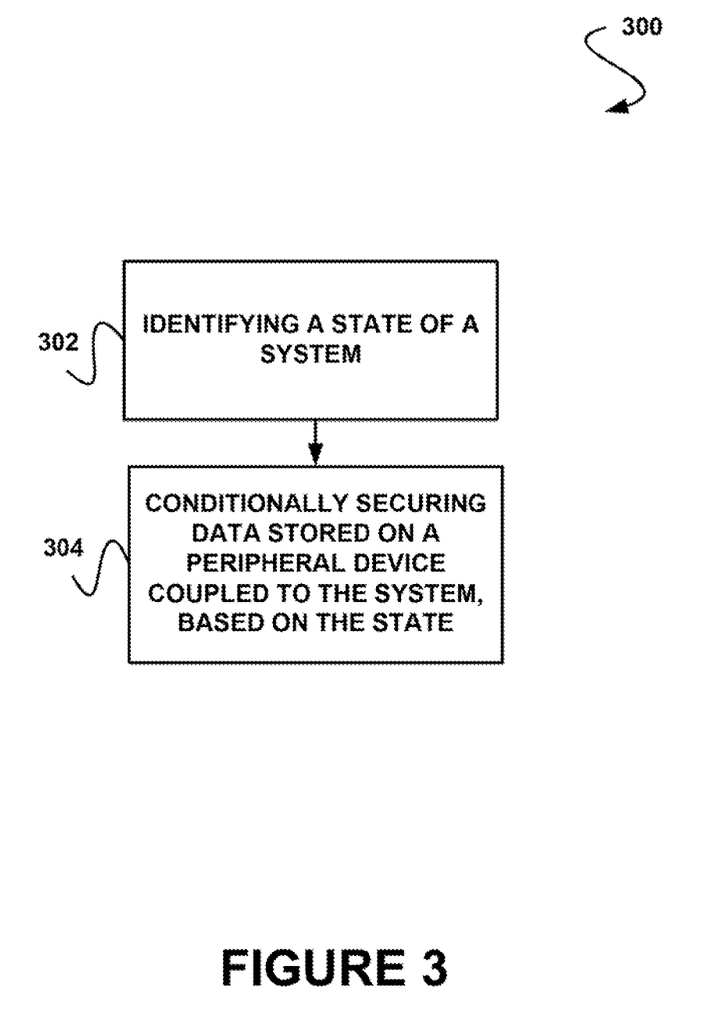
FIG. 3 shows a method for conditionally securing data stored on a peripheral device coupled to a system based on a state of the system, in accordance with one embodiment.

FIG. 3 shows a method 300 for conditionally securing data stored on a peripheral device coupled to a system based on a state of the system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a state of a system is identified. The system may include any system to which a peripheral device may be coupled, as described in more detail below. As an option, the system may include any of the servers 104 and/or clients 106 illustrated in FIG. 1.

Additionally, in the context of the present description, the state may be one or more current configurations of the system. In one embodiment, the state of the system may include a locked state. Such locked state may indicate that at least one aspect of the system is at least partially nonfunctional. Just by way of example, the locked state may prevent access to data, applications, etc. stored on the system.

In another embodiment, the state of the system may include an unlocked state. The unlocked state may optionally indicate that the system is fully functional. For example, any data, applications, etc. associated with the device may be capable of being accessed when the system is in an unlocked state. In yet another embodiment, the state of the system may include an idle state. The idle state may indicate that at least some resources of the system are unused (e.g. by a user, etc.). In other various embodiments, the state of the system may include a powered down state, a powered up state, etc.

In one embodiment, the state of the system may be identified by monitoring one or more events associated with the system. For example, the system may be identified as being in the locked state if a lock message is received. In another example, the system may be identified as being in the unlocked state if an unlock message is received. Optionally, the lock message and/or the unlock message may be initiated by a user of the system, a predetermined event, etc.

In another embodiment, the state of the system may be automatically identified in response to a change in such state. For example, if the system is in an idle state for a predetermined period of time the state of the system may be automatically changed from the idle state to a locked state. In this way, the locked state of the system may be identified in response to the change. In another example, if the system is rebooted, the state of the system may be automatically changed from a power up state to a locked state. Accordingly, the locked state of the system may be identified in response to the change of the state of the system from the powered up state to the locked state. Of course, however, the state of the system may be identified in any manner. In still another embodiment, the state of the system may be identified by a system status monitor.

Additionally, as shown in operation 304, data stored on a peripheral device coupled to the system is conditionally secured, based on the state. In the context of the present description, the data may include any information that is capable of being stored on the peripheral device. For example, the data may include one or more audio files, text files, executable applications, image files, etc.

Furthermore, the peripheral device may be any device peripherally coupled to the system. Thus, the peripheral device may be external to the system. As an option, the peripheral device may include any of the disk storage units 220 illustrated in FIG. 2. As another option, the peripheral device may include a flash memory based storage device, a hard disk drive, a digital versatile disc (DVD) drive, a compact disc read-only memory (CD-ROM) drive, a digital camera, a universal serial bus (USB) drive, etc.

In another embodiment, the peripheral device may be coupled to the system via one or more adapters. For example, the peripheral device may be coupled to the system via a USB interface, an institute of Electrical and Electronics Engineers (IEEE) 1394 interface, a network adapter interface, etc. As an option, the peripheral device may be coupled to the system via the I/O adapter 218 illustrated in FIG. 2. Of course, however, the peripheral device may be coupled to the system in any manner.

In still another embodiment, the data may be secured by transferring the data from the peripheral device to another device. For example, the data may be transferred from the peripheral device to a device coupled to the system via a network. As another example, the data may be transferred from the peripheral device to a device located within the system. Such device within the system may include any system disk storage units located within the system. In yet another embodiment, the data may be secured by being deleted from the peripheral device, such as, for example, in response to the data being transferred from the peripheral device to another device.

In still another embodiment, securing, the data may include encrypting the data. For example, the data may be stored on the peripheral device in an encrypted form (e.g. utilizing the peripheral device, utilizing the system, etc.). In another example, the data may be transferred from the peripheral device to another device and stored in an encrypted form on the other device. In yet another embodiment, securing the data may include at least partially disabling the peripheral device. For example, one or more aspects of the peripheral device (e.g. resources, hardware, etc.) may be locked, thus rendering such aspects at least partially nonfunctional. Thus, an eject mechanism of a CD-ROM or DVD drive may be disabled, as an option.

Additionally, in one embodiment, the data may be secured if the system is in a locked state. For example, the data may be transferred from the peripheral device to another device if the system enters a locked state. Optionally, the data may be restored to the peripheral device in response to identification of an unlocked state of the system. In yet another embodiment, the data may be secured by activating an alarm if the peripheral device is separated from the system when the system is in a locked state.

It should be noted, however, that the data stored on the peripheral device may be secured based on any state of the system that matches a predetermined state. For example, rules may indicate predetermined states in which the data is to be secured. Further, the rules may optionally be user configured.

In another embodiment, the data may be conditionally secured by an agent. In addition, in still another embodiment, the agent may be monitored and/or controlled by a remote device.

Figure 4:
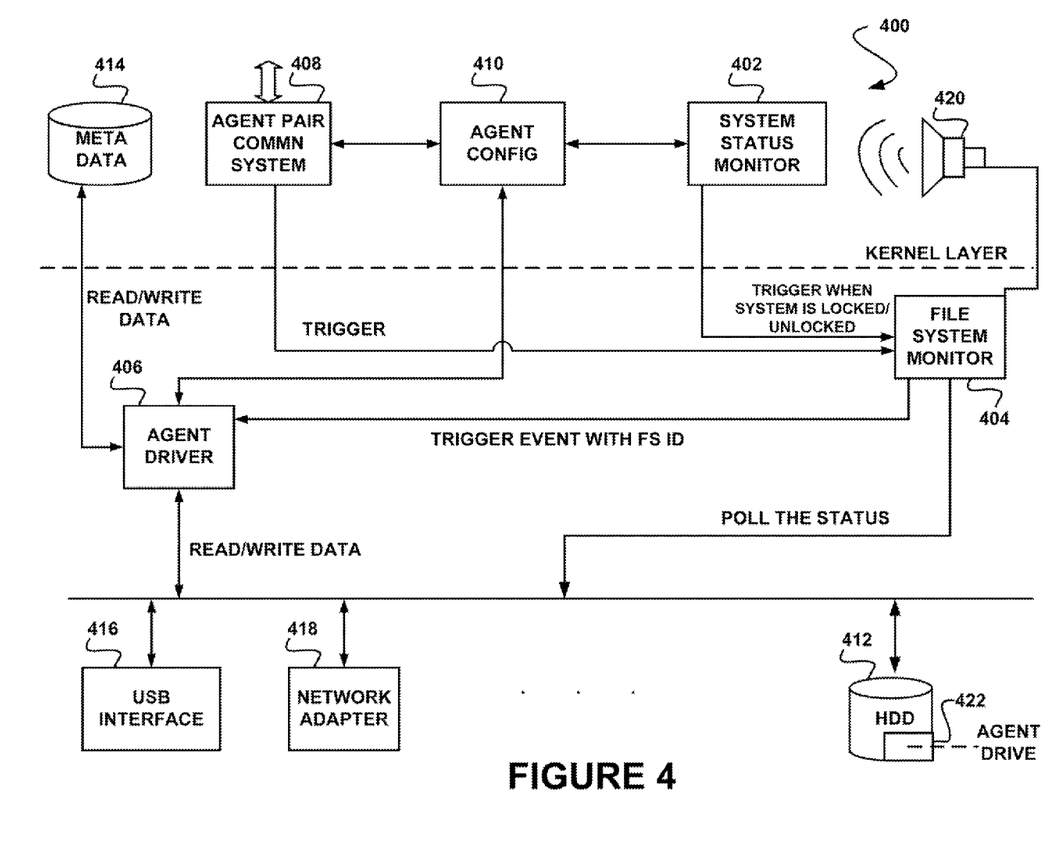
FIG. 4 shows a system for conditionally securing data stored on a peripheral device coupled to a system based on a state of the system, in accordance with another embodiment.

FIG. 4 shows a system 400 for conditionally securing data stored on a peripheral device coupled to a system based on a state of the system, in accordance with another embodiment. As an option, the system 400 may be implemented in the context of the details of FIGS. 1-3. Of course, however, the system 400 may be implemented in any desired environment. It should also be noted that the aforementioned definitions may apply during the present description.

As shown, a system status monitor 402 is in communication with a file system monitor 404. As shown, the system status monitor 402 may be in communication with the file system monitor 404 across a kernel layer (e.g., of the system 400, etc.). In the context of the present embodiment, the system status monitor 402 may include any module capable of monitoring a state of the system 400. In one embodiment, the system status monitor 402 may detect one or more events associated with the locking and/or unlocking of the system 400. For example, the system status monitor 402 may detect one or more instructions (e.g. initiated by a user, initiated automatically based on a predefined condition being met, etc.) to lock or unlock the system. In another example, the system status monitor 402 may detect one or more instructions to reboot the system.

In still another embodiment, the file system monitor 404 may receive one or more signals from the system status monitor 402 indicating the state of the system 400. For example, the file system monitor 404 may receive a lock signal from the system status monitor 402 indicating that the state of the system 400 has changed from an unlocked state to a locked state, an unlock signal from the system status monitor 402 noting that the state of the system 400 has changed from a locked state to an unlocked state, etc.

Additionally, the file system monitor 404 is in communication with a USE interface 416 as well as a network adapter 418 (e.g. via a bus, etc.). In the context of the current embodiment, the USE interface 416 may be any interface that allows a USB connection from the system 400 to a peripheral USB device. In addition, the network adapter 418 may be any adapter capable of allowing communication between the system 400 and a network.

In one embodiment, the file system monitor 404 may monitor the system 400 for determining whether one or more peripheral devices are coupled to the system 400 (e.g. via the USB interface 416, the network adapter 418, etc.). For example, the file system monitor 404 may contact (e.g. periodically poll, etc.) the USB interface 416 and/or the network adapter 418 in order to determine whether one or more devices are coupled to the system 400 via such USB interface 416 and/or the network adapter 418. In another example, the file system monitor 494 may monitor the peripheral devices, such as, for example, by contacting the USE interface 416 and/or the network adapter 418 in order to determine a status of any peripheral devices coupled to the system 400. In the context of the present embodiment, the status of the peripheral devices may include any indication of a configuration of the peripheral devices, events performed with respect to the peripheral devices, etc. In another embodiment, only a portion of the peripheral devices coupled to the system 400 via the USB interface 416, the network adapter 418, or both may be monitored.

As an option, the file system monitor 404 may retrieve information regarding one or more peripheral devices coupled to the system 400 via the USB interface 416 and/or the network adapter 418 in response to communicating with the system status monitor 402. For example, in response to receiving a lock signal from the system status monitor 402, the file system monitor 404 may contact the USB interface 416 and/or the network adapter 418 in order to determine whether any peripheral devices are coupled to the system 400.

in another example, if the file system monitor 404 determines that one or more peripheral devices are coupled to the system 400, the file system monitor 404 may also communicate with the peripheral devices in order to determine one or more characteristics of the peripheral devices, such as, for example, whether the peripheral devices have data stored thereon. In this way, the file system monitor 404 may determine whether any action (e.g. preconfigured action, etc.) is to be taken for securing data stored on the peripheral devices. Just by way of example, the file system monitor 404 may control actions associated with processes on the peripheral devices for securing data stored on the peripheral devices.

In addition, the file system monitor 404 is in communication with an agent driver 406. Further, the agent driver 406 is in communication with the USB interface 416 as well as the network adapter 418. In one embodiment, the agent driver 406 may secure data stored on the peripheral devices connected to the agent 400 via the USB interface 416 and/or the network adapter 418.

In another embodiment, the agent driver 406 may secure the data stored on the peripheral devices in response to communications with the file system monitor 404. For example, the agent driver 406 may secure the data stored on the peripheral devices in response to receiving a lock signal from the file system monitor 404. Optionally, the data may be secured by locking the peripheral device (e.g. preventing access to the peripheral device via the system 400, etc.), transferring the data from the peripheral device to an agent drive 422, etc.

In another example, the agent driver 406 may remove any security placed on the data in response to receiving an unlock signal from the file system monitor 404. For example, the agent driver 406 may unlock the peripheral device (e.g. allow access to the peripheral device via the system 400, etc.), transfer the data from the agent drive 422 to the peripheral device, etc. Of course, however, the agent driver 406 may secure the data in any desired manner.

Further still, the agent driver 406 and the system status monitor 402 are in communication with an agent configurator 410. In one embodiment, the agent configurator 410 may configure one or more aspects of the agent driver 406 (e.g. based on use input, etc.). Optionally, the aspects may include actions to be taken by the agent driver 406 in response to receipt of an indication of a state of the system 400 from the file system monitor 404. For example, the actions may include those to be performed in response to a security alert, which will be described in more detail below. As another example, the actions may include those to be performed in response to the removal of one or more peripheral devices coupled to the system 400. Further, the configurator 410 may configure the agent driver 406 with an encryption algorithm to be utilized for encrypting data stored on the peripheral devices, a location to which data stored on the peripheral devices is to be transferred, etc.

Additionally, the agent driver 406 and the file system monitor 404 are in communication with a hard disk drive 412, which includes an agent drive 422. The agent drive 422 may include one or more portions of the hard disk drive 412. For example, the agent drive 422 may include a partition on the hard disk drive 412. In one embodiment, the agent driver 406 may transfer data between the agent drive 422 and one or more peripheral devices connected it the USB interface 416 and/or the network adapter 418.

For example, in response to receiving the lock signal from the file system monitor 404, the agent driver 406 may transfer data from a peripheral device to the agent drive 422. In another example, in response to receiving the unlock signal from the file system monitor 404, the agent driver 406 may transfer data from the agent drive 422 to the peripheral device.

In yet another embodiment, the agent drive 422 may be configured when it is installed into the system 400. In still another embodiment, the agent drive 422 may be configured by the agent configurator 410. For example, a type of encryption used on data in the agent drive 422 may be determined by the agent configurator 410. Thus, as an option, the agent drive 406 may encrypt data transferred to the agent drive 422 and/or decrypt data transferred from the agent drive 406. In another example, a size and/or location of the agent drive 422 may be determined by the agent configurator 410. In another embodiment, the agent drive 422 may only be accessible by the agent driver 406 (e.g. by placing access controls on the agent drive 422, etc.).

Further, the file system monitor 404 is in communication with an alarm module 420. In one embodiment, the alarm module 420 may be capable of triggering an alarm via one or more audio speakers of the system 400. In another embodiment, the file system monitor 404 may signal to the alarm module 420 to initiate the alarm if one or more events occur. For example, the file system monitor 404 may send a signal to the alarm module 420 if the file system monitor 404 receives the lock signal from the system status monitor 402 and subsequently detects any changes to one or more peripheral devices coupled to the system 400 (e.g. any of such peripheral devices being decoupled from the system 400, etc.).

It should be noted that, the alarm module 420 may terminate the triggered alarm based on any predefined criteria. In one embodiment, the alarm module 420 may terminate the alarm in response to the state of the system 400 changing to an unlocked state (e.g. based on a user manually selecting to unlock the system 400, etc). In another embodiment, the alarm module 420 may terminate the alarm in response to re-coupling of the peripheral device to the system 400. Optionally, the alarm may only be terminated via the re-coupling of the peripheral device to the system 400 if it is determined that data is not stored on the peripheral device (e.g. if it is determined that the data was transferred to the agent drive 422 prior to the peripheral device being de-coupled from the system 400).

Further still, the file system monitor 404 is in communication with an agent pair communication system 408. Also, the agent pair communication system 408 is in communication with the system status monitor 402 via the agent configurator 410. In one embodiment, the agent pair communication system 408 may receive data relating to the state of the system 400 from the file system monitor 404 and/or the system status monitor 402. In another embodiment, the agent pair communication system 498 may monitor the system 400 for undesired and/or unwanted power failures. In yet another embodiment, the agent configurator 410 may configure one or more aspects of the agent pair communication system 408.

In still another embodiment, the agent pair communication system 408 may send data to the file system monitor 404, the system status monitor 402, and/or the agent configurator 410. For example, the agent pair communication system 408 may send one or more instructions to the file system monitor 404 to be performed.

In another embodiment, the agent pair communication system 408 may be in communication with a remote device not shown). For example, the agent pair communication system 408 may be connected to the remote device over a network. As an option, the remote device may include one or more servers 104 and/or clients 106 as shown in FIG. 1. In yet another embodiment, the connection between the agent pair communication system 408 and the remote device may be a secure connection.

In still another embodiment, the agent pair communication system 408 may send data to the remote device. For example, the agent pair communication system 408 may send information regarding the state of the system 400 to the remote device. Additionally, in still another embodiment, the agent pair communication system 408 may receive data from the remote device.

For example, the agent pair communication system 408 may receive instructions from the remote device instructing the agent pair communication system 408 to perform one or more operations within the system 400. In another example, the agent pair communication system 408 may communicate instructions to the file system monitor 404 to be performed. In this way, the system 400 may be monitored and/or controlled by the remote device.

Also, the agent driver 406 is in communication with a meta database 414. The meta database 414 may be any database capable of storing metadata. In one embodiment, the meta database 414 may contain data relating to the system 400 and/or any peripheral devices coupled to the system 400 via the USB interface 416 and/or the network adapter 418. For example, the meta database 414 may contain a location of secured data associated with the peripheral devices.

In another example, the meta database 414 may contain a location on the agent drive 422 of secured data. In yet another example, the meta database 414 may contain the type of encryption used on data secured via the agent drive 422. In still another example, the meta database 414 may include a reason why data was transferred from the peripheral device to the agent drive 422.

Figure 5:
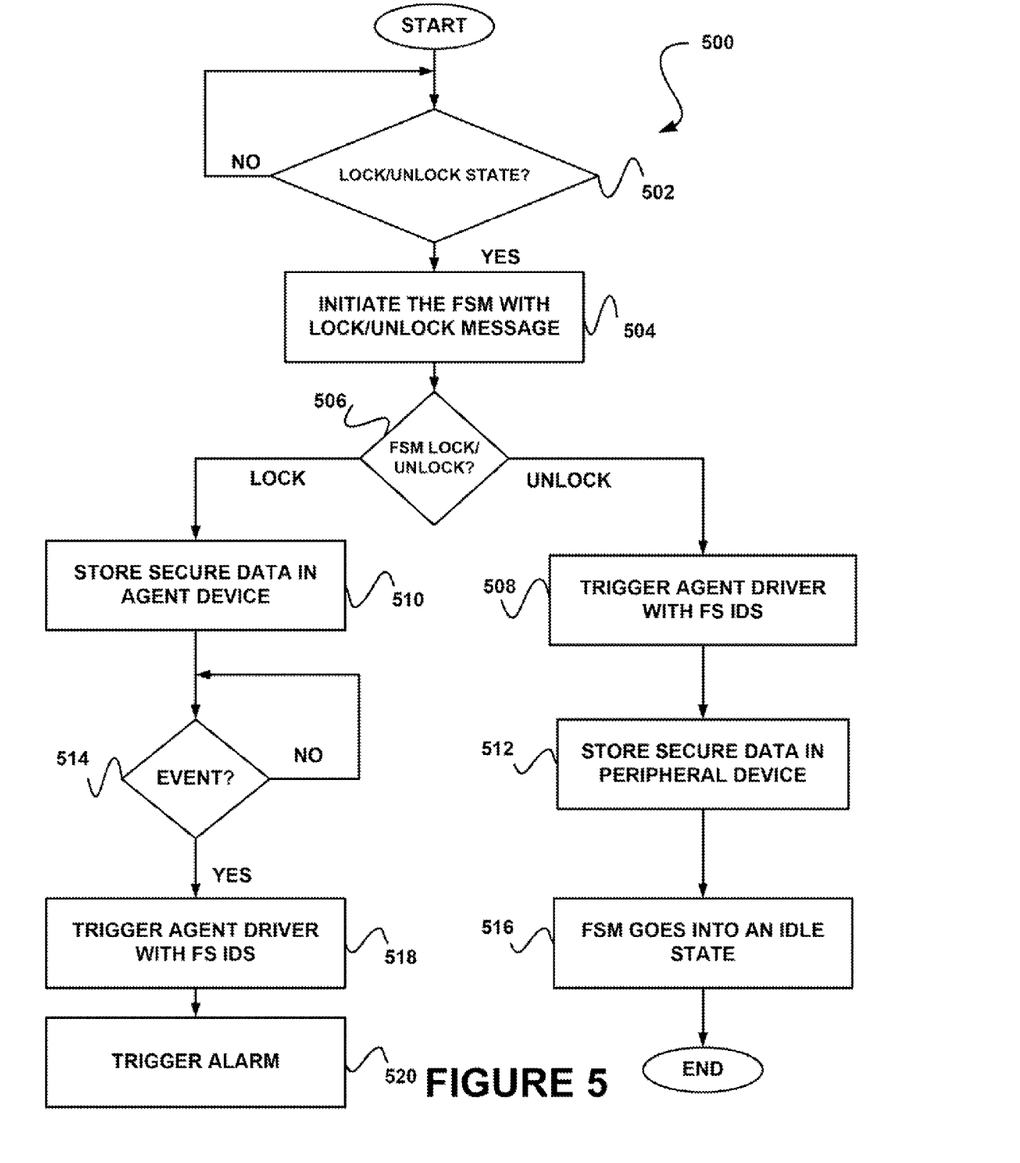
FIG. 5 shows a method for conditionally transferring data between an agent device and a peripheral device, in accordance with yet another embodiment.

FIG. 5 shows a method 500 for conditionally transferring data between an agent device and a peripheral device, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in decision 502, it is determined whether a state of a system has changed to a locked or unlocked state, respectively. The determination may be made by monitoring, a state of the system. In one embodiment, the lock or unlock state may be a result of a user action on the system. For example, the lock or unlock state may result from the user manually locking or unlocking the system using a keyboard or other input device.

In yet another embodiment, a change to the lock or unlock state may be made automatically based on a predefined condition being met. Thus, the state may be changed to the lock or unlock state as a result of an automatic event. For example, the state may be changed to a locked state when the system is rebooted. In another example, state may be changed to a locked state when the system is idle for a predetermined amount of time.

In still another embodiment, the determination may only be made after the system has been in the changed lock/unlock state for a predetermined amount of time. In this way, a determination of a changed state of the system may not be made if the system has been locked or unlocked for less than the predetermined amount of time.

In response to a determination in decision 502 that the state of the system has changed to a locked or unlocked state, a file system monitor is initiated with a lock or unlock message. Note operation 504. In one embodiment, a system status monitor which determined that the state of the system was changed to a locked or unlocked state may initiate the file system monitor by sending it an associated lock or unlock message. For example, if it is determined that the state of the system has changed to a locked state, the system status monitor may send a lock message to the file system monitor. In another example, it is determined that the state of the system has changed to an unlocked state, the system status monitor may send the unlock message to the file system monitor.

Additionally, in decision 506 it is determined whether the file system monitor has been initiated with a lock or unlock message. Further, if in decision 506 it is determined that the file system monitor has been initiated with a lock message, then in operation 510 secure data is stored in an agent device (e.g. the agent driver 422 of FIG. 4, etc.). In one embodiment, the secure data may originate from a peripheral device coupled to the system.

As an option, the data may be deleted from the peripheral device once the data is securely stored in the agent device. As another option, the secure data may be encrypted before or after it is stored in the agent device. In yet another embodiment, an identifier of the peripheral device and/or a location of the secure data on the agent device may be stored in a meta database.

Further still, in decision 514 it is determined whether an event has occurred. In the context of the present embodiment, the event may include any event associated with the peripheral device. In one embodiment, the event may include removal of the peripheral device from being coupled to the system. For example, the event may include unplugging the peripheral device from the system.

Additionally, in response to a determination in decision 514 that an event, has occurred, an agent driver is triggered with at least one file system identifier. Note operation 518. In one embodiment, the file system identifier may include information about the peripheral device. For example, the file system identifier may include identifiers of the peripheral device which has been decoupled from the system.

Furthermore, in operation 520 an alarm is triggered. In one embodiment, the file system monitor may trigger the alarm. In another embodiment, the alarm may include an audible alarm. In yet another embodiment, the alarm may include a visual alarm. In still another embodiment, the alarm may include information about the event. For example, the alarm may include the identifier of the peripheral device. In this way, a user of a system may be notified when the peripheral device is decoupled from the system, as an option. As another option, the alarm may also be communicated to a remote system (e.g. via the agent pair communication system 408 of FIG. 4).

Additionally, if in decision 506 it is determined, that the file system monitor has been initiated with an unlock event message, in operation 508 the agent driver is triggered with at least one file system identifier. For example, the file system identifier may include an identifier of any peripheral device that is coupled to the system. In another example, the file system identifier may include the identifier of the peripheral device that has data stored in the agent device (operation 510).

Further, in operation 512 secure data is stored in the peripheral device. In one embodiment, the secure data may be transferred from the agent device. Thus, for example, peripheral device data which has been stored in the agent device in response to a locked state of the system may be transferred back to the peripheral device in response to a subsequent unlocked state of the system. In another embodiment, the secure data may be deleted from the agent device once the secure data is stored in the peripheral device.

In another embodiment, the secure data may be decrypted before or after it is stored in the peripheral device. For example, the secure data may be restored to its original format before being stored in the peripheral device. In yet another embodiment, the location on the agent device where the secure data is stored may be retrieved from the meta database for identifying the appropriate secure data to be stored in the peripheral device. In still another embodiment, the identity of the peripheral device to which the secure data is to be stored (e.g. the peripheral device from which the secure data was transferred to the agent device) may be retrieved from the meta database.

Further still, in operation 516 the file system monitor goes into an idle state. In one embodiment, the file system monitor may continue to monitor the peripheral device. In another embodiment, the file system monitor may wait to be initiated with another lock or unlock message from the system status monitor.

While various embodiments have been described above, it should be understood that they have been presented by way of example only, and not limitation. For example, any of the network elements may employ any of the decried functionality set forth hereinabove. Thus, the breadth and scope of a preferred embodiment should not be limited by any of the above-described exemplary embodiments, but should be defined only in accordance with the following claims and then equivalents.

What is claimed is:

1. A host-based data security method, comprising:
   determining, by a system status monitor, a state of a host computer system, wherein at least some of the system status monitor is stored in and executing from kernel memory in the host computer system;
   notifying, by the system status monitor, a file system monitor of the host computer system's state, wherein at least some of the file system monitor is stored in and executing from non-kernel memory in the host computer system;
   determining, by the file system monitor, a peripheral device is communicatively coupled to the host computer system; and
   conditionally securing data on the peripheral device based on the determined state of the host computer system.

2. The method of claim 1, wherein the act of determining a peripheral device is communicatively coupled to the host computer system, further comprises determining, by the file system monitor, that the peripheral device is capable of storing information.

3. The method of claim 1, wherein the act of conditionally securing data on the peripheral device comprises:
   encrypting the data, by a security module, wherein at least some of the security module is stored in and executing from the non-kernel memory in the host computer system; and
   storing the encrypted data on the peripheral device if the state of the host computer system is locked.

4. The method of claim 3, further comprises disabling at least a portion of the peripheral device.

5. The method of claim 3, further comprising:
   detecting, by the file system monitor, that the peripheral device is no longer communicatively coupled to the host computer system; and
   causing, by the file system monitor, an alarm to be issued.

6. The method of claim 5, further comprising:
   determining, by the system status monitor, that the state of the host computer system has changed to unlocked; and
   cancelling the alarm.

7. The method of claim 5, further comprising:
   determining after the act of issuing the alarm, by the file system monitor, that the peripheral device is re-communicatively coupled to the host computer system; and
   cancelling the alarm.

8. The method of claim 1, wherein the act of conditionally securing data on the peripheral device based on the host computer system's state comprises:
   retrieving data from a memory external to the peripheral device;
   decrypting the retrieved data, by a security module, wherein at least some of the security module is stored in and executing from the non-kernel memory in the host computer system; and
   storing the decrypted retrieved data on the peripheral device if the state of the host computer system is unlocked.

9. The method of claim 1, wherein the act of conditionally securing data on the peripheral device comprises:
   retrieving information from the peripheral device;
   encrypting the information, by a security module, to generate data, wherein at least some of the security module is stored in and executing from non-kernel memory in the host computer system; and
   storing the data on the peripheral device if the state of the host computer system is locked.

10. The method of claim 9, further comprising deleting the information from the peripheral device.

11. The method of claim 1, wherein the act of conditionally securing data on the peripheral device comprises:
   retrieving data from a memory external to the peripheral device wherein the data is encrypted; and storing the data on the peripheral device if the state of the host computer system is locked.

12. The method of claim 1, wherein the act of determining a state of a host computer system comprises determining, by the system status monitor, the host computer system has transitioned from an unlocked state to a locked state.

13. The method of claim 12, wherein the act of conditionally securing data on the peripheral device based on the host computer system's state comprises:

retrieving data from a memory other than a memory in the peripheral device;

encrypting, by a security module, the retrieved data, wherein at least some of the security module is stored in and executing from the non-kernel memory in the host computer system; and storing the encrypted stored data on the peripheral device based on the state of the host computer system changing from an unlocked state to a locked state.

14. A program storage device having computer executable instructions tangibly stored thereon, the computer executable instructions for causing a computer to perform the method of claim 1.

* * * * *